United States Patent
Hwang et al.

(10) Patent No.: US 8,181,044 B2
(45) Date of Patent: May 15, 2012

(54) APPARATUS AND METHOD FOR DETERMINING OPERATION MODE OF NODE IN AD HOC NETWORK

(75) Inventors: So-young Hwang, Busan (KR); Seong-soon Joo, Daejeon-si (KR); Jong-suk Chae, Daejeon-si (KR); Seong-lyun Kim, Seoul (KR); Jin-hong Jung, Yongin-si (KR); Su-jin Park, Seoul (KR)

(73) Assignees: Electronic and Telecommunications Research Institute, Daejeon (KR); Industry-Academic Cooperation Foundation, Yonsei University, Seoul (KR)

( * ) Notice: Subject to any disclaimer, the term of this patent is extended or adjusted under 35 U.S.C. 154(b) by 404 days.

(21) Appl. No.: 12/628,183

(22) Filed: Nov. 30, 2009

(65) Prior Publication Data

US 2010/0169691 A1 Jul. 1, 2010

(30) Foreign Application Priority Data

Dec. 26, 2008 (KR) ......................... 10-2008-0134648
Apr. 14, 2009 (KR) ......................... 10-2009-0032219

(51) Int. Cl.
*G06F 1/00* (2006.01)
*G06F 9/44* (2006.01)
*G06F 15/173* (2006.01)

(52) U.S. Cl. ........ 713/300; 709/238; 709/239; 709/242; 717/105

(58) Field of Classification Search .................. 713/300; 717/105; 709/238, 239, 242
See application file for complete search history.

(56) References Cited

U.S. PATENT DOCUMENTS

| | | | |
|---|---|---|---|
| 6,804,542 B1* | 10/2004 | Haartsen ...................... | 455/574 |
| 7,729,285 B2* | 6/2010 | Yoon ............................ | 370/254 |
| 7,924,758 B2* | 4/2011 | Park et al. ................... | 370/311 |
| 2006/0129850 A1* | 6/2006 | Hassan et al. ................ | 713/300 |
| 2007/0014268 A1 | 1/2007 | Kim et al. | |
| 2007/0253352 A1* | 11/2007 | Arisha et al. ................. | 370/328 |
| 2008/0309480 A1 | 12/2008 | Youn et al. | |

FOREIGN PATENT DOCUMENTS

| | | | |
|---|---|---|---|
| KR | 10-2002-0059296 A | | 7/2002 |
| KR | 1020050102714 A | | 10/2005 |
| KR | 1020070009102 A | | 1/2007 |

OTHER PUBLICATIONS

Riku Jäntti et al., "Joint Data Rate and Power Allocation for Lifetime Maximization in Interference Limited Ad Hoc Networks", IEEE Transactions on Wireless Communications, May 2006, pp. 1086-1094, vol. 5, No. 5.

* cited by examiner

*Primary Examiner* — Mark Connolly

(57) ABSTRACT

Provided is a method of determining an operation mode of a node in an ad hoc network. The method includes: monitoring a measured amount of residual energy of the node and comparing the measured amount of residual energy of the node with an amount of residual energy theoretically calculated for the node; identifying an amount of information in a queue included in the node; calculating a relay probability of the node by reflecting the identified amount of information in the queue and the result of comparing the measured amount of residual energy of the node with the theoretically calculated amount of residual energy for the node; and determining the operation mode of the node to be one of a relay mode and a transmission mode, based on the calculated relay probability of the node. The method enables nodes to exchange information about their respective amounts of residual energy and analyze the information without using additional resources and processes.

10 Claims, 3 Drawing Sheets

APPARATUS AND METHOD FOR DETERMINING OPERATION MODE OF NODE IN AD HOC NETWORK

CROSS REFERENCE TO RELATED APPLICATIONS

This application claims the benefit under 35 U.S.C. §119 (a) of Korean Patent Application Nos. 10-2008-0134648, filed on Dec. 26, 2008, and 10-2009-0032219, filed on Apr. 14, 2009, the disclosures of which are incorporated by reference herein for all purposes.

BACKGROUND

1. Field

The following description relates to an ad hoc network, and more particularly, to an apparatus and method for determining an operation mode of a node in an ad hoc network.

2. Description of the Related Art

A large amount of research is being conducted in order to increase a lifetime of ad hoc networks through efficient use of energy. As a result of such research, a technology, which achieves an energy balance using an appropriate routing technique to allow a plurality of nodes to use similar amounts of energy and to thus increase the lifetime of ad hoc networks, has been suggested. However, the technology has a lifetime maximizing problem.

To solve this problem, a plurality of nodes may exchange information about their respective amounts of residual energy and analyze the information to set paths. In this method, however, additional resources and processes are required to exchange the above mentioned information between the nodes and analyze the information.

SUMMARY

The following description relates to an apparatus and method for determining an operation mode of a node, the apparatus and method being employed to increase the lifetime of mobile ad hoc networks without requiring additional resources and processes to exchange information about respective amounts of residual energy of nodes between the nodes and to analyze the information.

In one general aspect, there is provided a method of determining an operation mode of a node in an ad hoc network. The method includes: monitoring a measured amount of residual energy of the node and comparing the measured amount of residual energy of the node with an amount of residual energy theoretically calculated for the node; identifying an amount of information in a queue included in the node; calculating a relay probability of the node by reflecting the identified amount of information in the queue and the result of comparing the measured amount of residual energy of the node with the theoretically calculated amount of residual energy for the node; and determining the operation mode of the node to be one of a relay mode and a transmission mode, based on the calculated relay probability of the node.

The method further includes determining transmission power of the node by reflecting the identified amount of information in the queue and the result of comparing the measured amount of residual energy of the node with the amount of residual energy theoretically calculated for the node.

In another aspect, there is provided an apparatus for determining an operation mode of a node. The apparatus includes: a monitoring unit monitoring an amount of residual energy of the node; an information amount identifying unit identifying an amount of information in a queue of the node; and a control unit comparing the monitored amount of residual energy of the node with an amount of residual energy theoretically calculated for the node, calculating a relay probability of the node by reflecting the identified amount of information in the queue and the result of comparing the monitored amount of residual energy of the node with the theoretically calculated amount of residual energy for the node, and determining the operation mode of the node based on the calculated relay probability.

Other features will become apparent to those skilled in the art from the following detailed description, which, taken in conjunction with the attached drawings, discloses exemplary embodiments of the invention.

BRIEF DESCRIPTION OF THE DRAWINGS

Elements, features, and structures are denoted by the same reference numerals throughout the drawings and the detailed description, and the size and proportions of some elements may be exaggerated in the drawings for clarity and convenience.

DETAILED DESCRIPTION

The above and other features and advantages of the present invention will become more apparent by describing exemplary embodiments thereof with reference to the attached drawings. Exemplary embodiments of the present invention will now be described in detail so that they can be readily understood and applied by those skilled in the art.

According to an exemplary embodiment of the present invention, each node in a plurality of mobile ad hoc networks determines its operation mode, that is, whether to operate in a relay mode, based on its relay probability and updates its relay probability based on the amount of its residual energy and the state of its queue. Accordingly, the required quality of service can be guaranteed, and the lifetime of the mobile ad hoc networks can be maximized through efficient use of energy.

According to an aspect of the present invention, the amount of residual energy of each node in ad hoc networks is determined not based on an absolute amount of measured residual energy but based on an estimated amount of residual energy which is predetermined by analyzing energy consumption using a mathematical tool.

Figure 1:
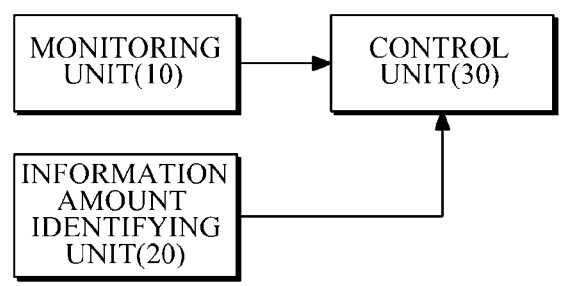
FIG. 1 is a block diagram of an apparatus for determining an operation mode of a node according to an exemplary embodiment of the present invention.

FIG. 1 is a block diagram of an apparatus for determining an operation mode of a node according to an exemplary embodiment of the present invention. The apparatus may be implemented in each node that dynamically operates in ad hoc networks. In an exemplary embodiment, each node may determine its operation mode based on a value of its relay probability, which is calculated by the apparatus, and perform a relay operation or a data transmission operation based on the determined operation mode.

Referring to FIG. 1, the apparatus according to the current exemplary embodiment includes a monitoring unit 10, an information amount identifying unit 20, and a control unit 30.

The monitoring unit 10 monitors the amount of residual energy of each node, and the information amount identifying unit 20 identifies the amount of information which is accumulated in a queue of each node to be transmitted to other nodes.

The control unit 30 compares the actual amount of residual energy, which is monitored by the monitoring unit 10, with the amount of residual energy which is theoretically calculated. Then, the control unit 30 calculates a relay probability by reflecting the comparison result and the amount of information identified by the information amount identifying unit 20.

In an exemplary embodiment, when the monitored amount of residual energy is greater than the theoretically calculated amount of residual energy, the control unit 30 increases a value of the relay probability in proportion to the difference between the monitored amount of residual energy and the theoretically calculated amount of residual energy.

Specifically, when the difference between the monitored amount of residual energy and the theoretically calculated amount of residual energy is a positive number, it is determined that a corresponding node has sufficient residual energy. When the difference between the monitored amount of residual energy and the theoretically calculated amount of residual energy is a negative number, it is determined that the node has relatively insufficient residual energy.

When the node has sufficient residual energy, the control unit 30 raises the relay probability, thereby increasing the probability that the node can act as a relay node. When the node has insufficient residual energy, the control unit 30 lowers the relay probability, thereby reducing the probability that the node can act as a relay node. In so doing, energy consumption due to the relay operation can be reduced. In addition, the control unit 30 can induce all nodes in ad hoc networks to consume energy in a balanced manner.

The control unit 30 reduces the value of the relay probability in proportions to the amount of information accumulated in the queue which is identified by the information amount identifying unit 20. Information, which is received by a node when in a relay mode and should be transmitted to other nodes, or information which is produced by the node and should be transmitted to other nodes, must be stored in a queue of the node until the operation mode of the node switches to a transmission mode. If information that should be transmitted is in a queue of a node, even when the node has insufficient residual energy, the information must be transmitted to other nodes in order to guarantee quality of service of the entire network. Therefore, the control unit 30 lowers the relay probability as the amount of information accumulated in the queue increases, thereby increasing the probability that the node will operate in the transmission mode. Specifically, the control unit 30 determines a variation in the relay probability based on the amount of information accumulated in the queue. That is, the control unit 30 significantly reduces the relay probability when a large amount of information is accumulated in the queue and slightly reduces the relay probability when a small amount of information is accumulated in the queue.

In the current exemplary embodiment, the control unit 30 may determine transmission power based on information about energy state of each node, which is identified by the monitoring unit 10, and the amount of information in the queue which is identified by the information amount identifying unit 20. When a node is in the relay mode, if the amount of information in a queue of the node exceeds a preset threshold and if the node has insufficient residual energy, the control unit 30 determines that network load is excessively concentrated on the node. Thus, the node receives no new packets. When the node is in the transmission mode, if the amount of information in the queue exceeds the preset threshold and if no relay node exists around the node, the control unit 30 increases the transmission power of the node. Accordingly, the communication range of the node is increased, thereby guaranteeing quality of service of the entire network.

To guarantee quality of service of ad hoc networks, the control unit 30 also updates the relay probability and transmission power in real time or periodically, based on the state of a queue of each node.

Figure 2:
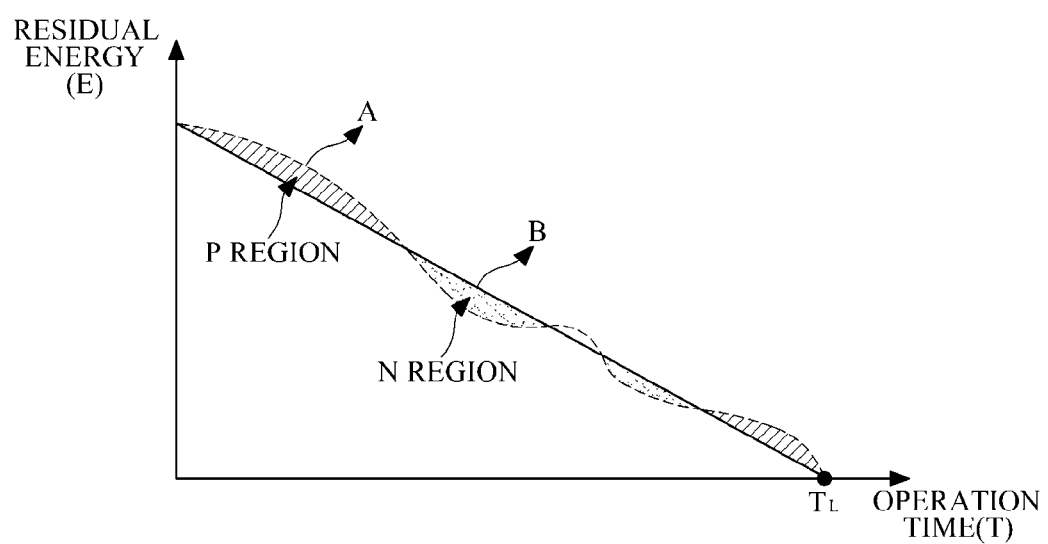
FIG. 2 is a graph illustrating the amount of residual energy monitored by a monitoring unit.

FIG. 2 is a graph illustrating the amount of residual energy monitored by the monitoring unit 10. The graph of FIG. 2 illustrates the amount of residual energy of a node in an ad hoc network. The Y-axis represents residual energy E, and the X-axis represents operation time T.

Generally, the amount of battery energy reduces linearly and then reduces quickly following the linear section. By reflecting this characteristic, it is assumed that an end point of the linear section is a lifetime $T_L$. That is, a point at which the amount of residual energy is zero and which meets the X-axis is the lifetime $T_L$.

A solid line "B" on the graph indicates an estimated amount of residual energy of a node in an ad hoc network which is obtained using a mathematical method. A dotted line "A" indicates a measured amount of residual energy of the node.

A hatched region (a P region) is a section in which the difference between the measured amount of residual energy and the estimated amount of residual energy is a positive number, and the area of the hatched region corresponds to an excess of residual energy. On the other hand, a dotted region (an N region) is a section in which the measured amount of residual energy and the estimated amount of residual energy is a negative number, and the area of the dotted region corresponds to a shortage of residual energy.

In the current exemplary embodiment, the estimated amount of residual energy obtained using a mathematical method varies linearly as indicated by the solid line "B." However, the present invention may also be applicable to the estimated amount of residual energy that varies non-linearly.

In the current exemplary embodiment, as illustrated in FIG. 2, the monitoring unit 10 may determine that sufficient residual energy exists in a section in which the difference between the measured amount of residual energy and the estimated amount of residual energy is a positive number, that is, in the hatched region and determine that relatively insufficient residual energy exists in a section in which the difference between the measured amount of residual energy and the estimated amount of residual energy is a negative number, that is, in the dotted region.

As described above, when a node has sufficient residual energy, the relay probability of the node is raised, thereby increasing the probability that the node will become a relay node. When the node has insufficient residual energy, the relay probability of the node is lowered, thereby reducing the probability that the node will become a relay node. In so doing, energy consumption due to the relay operation can be reduced. Since the operation mode of each node in ad hoc networks is changed based on the difference between a measured amount of residual energy and an estimated amount of residual energy, the lifetime of an actual system can be increased to be as close to the ideal lifetime $T_L$ as possible through balanced energy consumption.

Figure 3:
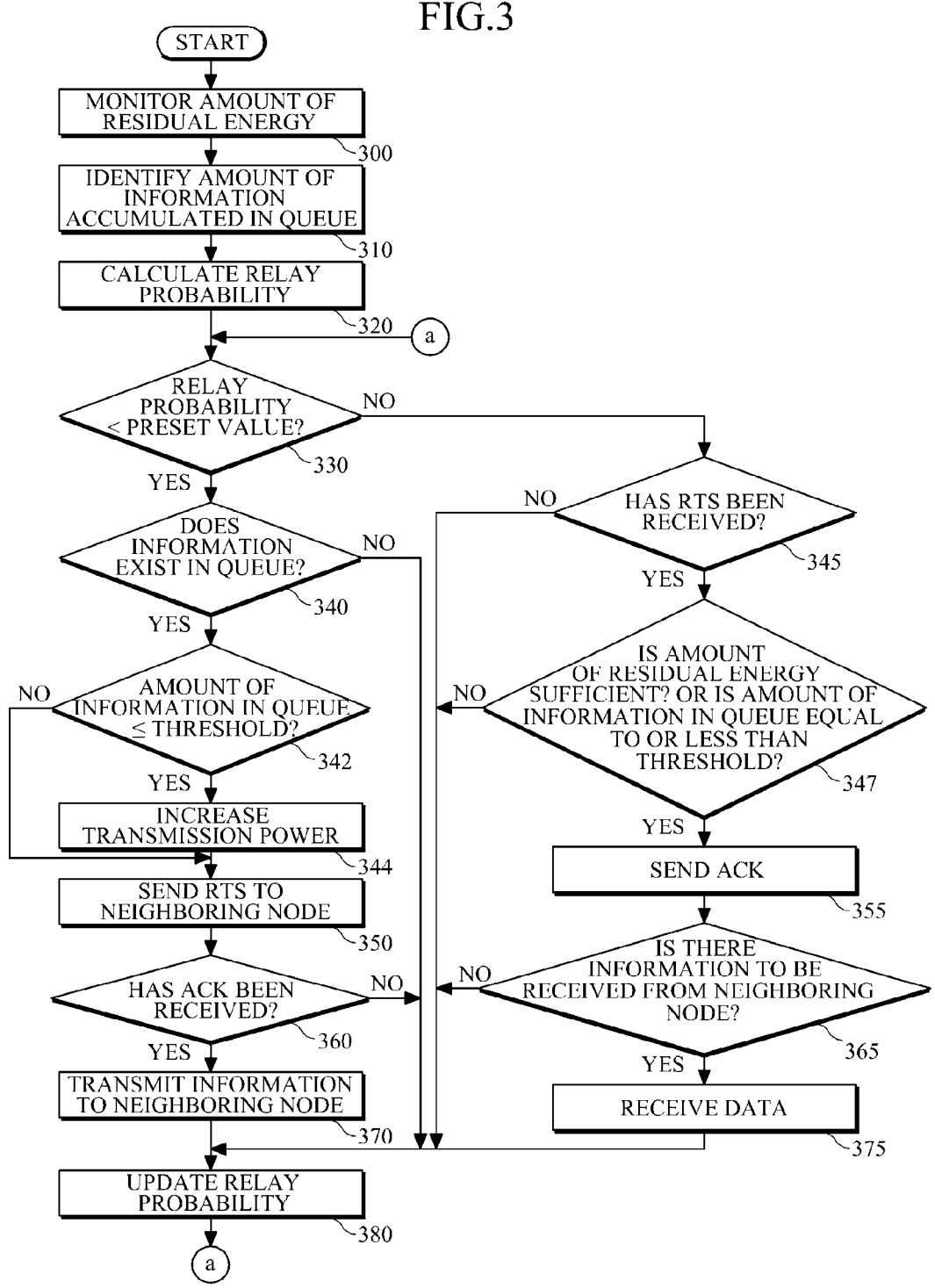
FIG. 3 is a flowchart illustrating a method of determining an operation mode of a node according to an exemplary embodiment of the present invention.

FIG. 3 is a flowchart illustrating a method of determining an operation mode of a node according to an exemplary embodiment of the present invention.

A node continuously participates in a network as long as it has residual energy. Here, the operation mode of the node participating in the network may be determined by a value of a relay probability of the node. That is, the node may operate as a relay node or a transmission node according to the value of the relay probability.

Referring to FIG. 3, the actual amount of residual energy of a node is monitored (operation 300). Then, monitoring is performed to determine whether information to be transmitted exists in a queue of the node (operation 310). A relay probability of the node is calculated by reflecting the monitored amount of residual energy and the amount of information accumulated in the queue (operation 320).

When the node has sufficient residual energy, the relay probability of the node is increased so that the node can relay more information and thus can facilitate network connection. When the node has insufficient residual energy, the relay probability of the node is lowered to reduce energy consumption due to the relay operation of the node.

When information to be transmitted exists in the queue of the node, the relay probability of the node is reduced based on the amount of information in the queue, so that the node can operate in the transmission mode, i.e., can transmit the information in the queue. That is, when a large amount of information exists in the queue of the node, the relay probability of the node is significantly reduced. When a small amount of information exists in the queue of the node, the relay probability of the node is slightly reduced.

The node operates in the transmission mode when the calculated relay probability is equal to or less than a preset value and operates in the relay mode when the calculated relay probability is greater than the preset value (operation 330).

When the node is in the transmission mode, that is, when the node operates as a transmission node, it is identified whether information to be transmitted exists in the queue of the node (operation 340). When the information to be transmitted exists in the queue, it is identified whether the amount of information accumulated in the queue of the node is equal to or less than a predetermined threshold (operation 342). When the amount of information accumulated in the queue is equal to or less than the predetermined threshold, transmission power of the node is not changed. On the other hand, when the amount of information accumulated in the queue is greater than the predetermined threshold, transmission power of the node is temporarily increased (operation 344). Then, the node in the transmission mode sends a request-to-send (RTS) to its neighboring nodes to inform that it will transmit the information (operation 350).

Each neighboring relay node, which receives the RTS from the node in the transmission mode, identifies whether the amount of information in a queue thereof is equal to or less than a predetermined threshold and whether it has sufficient residual energy. If the amount of information in the queue and the amount of residual energy satisfy preset conditions, each neighboring relay node sends an acknowledgement (ACK) to the node in the transmission mode. When receiving the ACK from the neighboring relay nodes (operation 360), the node in the transmission mode selects a relay node, which is most suitable for information transmission, from the neighboring relay nodes and transmits the information accumulated in its queue to the selected relay node (operation 370). Here, energy is consumed to transmit the information. The relay probability of the node is updated through a series of processes, based on a variation in the amount of information accumulated in the queue and a variation in the difference between the measured amount of residual energy and the amount of residual energy theoretically calculated for the node (operation 380). When no ACK is received from the neighboring relay nodes (operation 360), operation 380 in which the relay probability of the node is updated is immediately performed.

When the relay probability of the node is greater than the preset value (operation 330), the node operates in the relay mode, that is, operates as a relay node. In this case, if the node in the relay mode receives an RTS from its neighboring transmission node (operation 345), it identifies the amount of information accumulated in its queue and the amount of its residual energy in order to determine whether to send an ACK. When the amount of information accumulated in the queue of the node in the relay mode and the amount of residual energy of the node satisfy preset conditions (operation 347), the node in the relay mode sends an ACK to the neighboring transmission node (operation 355) and waits for information from the neighboring transmission node (operation 365). When the node in the relay mode receives the information from the neighboring transmission node (operation 375), energy is consumed. After consuming energy to receive the information, the node updates its relay probability (operation 380).

Figure 4:
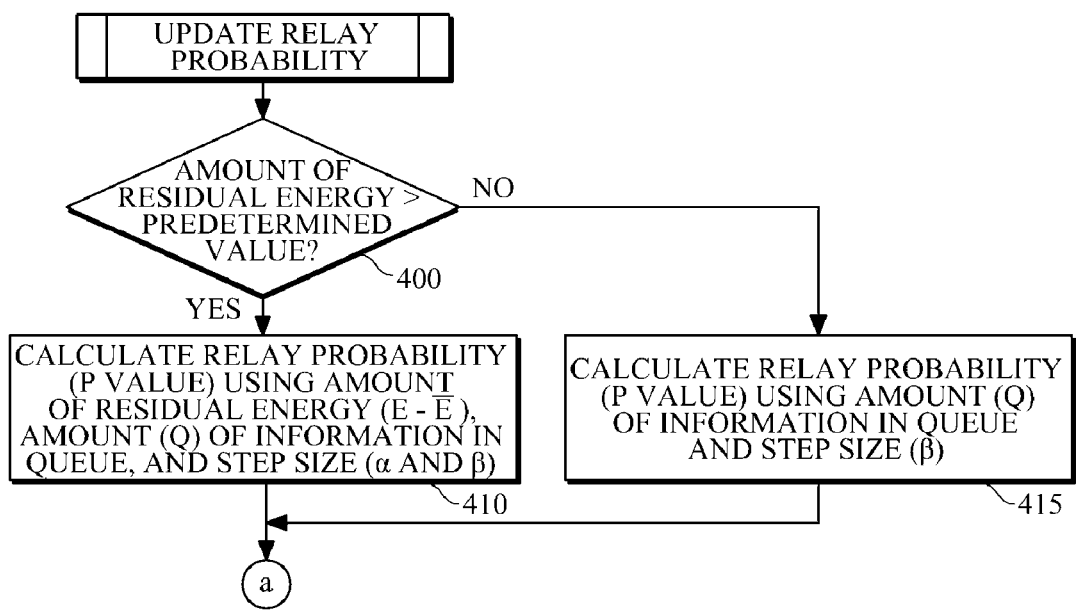
FIG. 4 is a flowchart illustrating operation 380 included in the method of FIG. 3.

FIG. 4 is a flowchart illustrating operation 380 included in the method of FIG. 3. The amount of residual energy may be identified based on the difference between a measured amount E of residual energy and an estimated amount $\overline{E}$ of residual energy which is theoretically calculated.

When the amount of residual energy is sufficient, e.g., greater than a predetermined value (operation 400), a relay probability is calculated using the amount of information in a queue and step sizes (operation 410). Specifically, the relay probability may be given by the following equation.

$$P'=P+\alpha-\beta Q,$$

where P indicates a value of an existing relay probability and P' indicates a value of an updated relay probability. As mentioned above, E indicates the measured amount of residual energy, and $\overline{E}$ indicates the estimated amount of residual energy which is theoretically calculated. In addition, $\alpha$ and $\beta$ respectively indicate step sizes used to adjust variations in the relay probability based on the amount of energy and the amount of information in a queue, and Q indicates the amount of information in the queue.

When the amount of residual energy is insufficient, e.g., less than the predetermined value (operation 400), the relay probability is calculated using the amount of information in the queue and a step size (operation 415). Specifically, the relay probability may be given by the following equation.

$$P'=P-\beta Q,$$

where P indicates a value of an existing relay probability, and P' indicates a value of an updated relay probability. In addition, $\beta$ indicates a step size used to reduce the relay probability based on the amount of information in a queue, and Q indicates the amount of information in the queue.

According to the present invention, each node adjusts its relay probability and transmission power in view of the amount of its residual energy and the state of its queue. Thus, the nodes can exchange information about their respective amounts of residual energy and analyze the information without using additional resources and processes. In addition, network reliability and quality of service can be guaranteed, and the lifetime of ad hoc networks can be increased through balanced and efficient use of energy.

The above-described method of determining an operation mode of a node can be written as a computer program. In addition, the computer program can be stored in a computer-readable medium and read and executed by a computer. Examples of the computer readable medium include a magnetic storage medium and an optical recording medium.

While this invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in a descriptive sense only and not for purposes of limitation. Therefore, the scope of the invention is defined not by the detailed description of the invention but by the appended claims, and all differences within the scope will be construed as being included in the present invention.

What is claimed is:

1. A method of determining an operation mode of a node in an ad hoc network, the method comprising:
monitoring a measured amount of residual energy of the node and comparing the measured amount of residual energy of the node with an amount of residual energy theoretically calculated for the node;
identifying an amount of information in a queue included in the node;
calculating a relay probability of the node by reflecting the identified amount of information in the queue and the result of comparing the measured amount of residual energy of the node with the theoretically calculated amount of residual energy for the node; and
determining the operation mode of the node to be one of a relay mode and a transmission mode, based on the calculated relay probability of the node.

2. The method of claim 1, further comprising determining transmission power of the node by reflecting the identified amount of information in the queue and the result of comparing the measured amount of residual energy of the node with the amount of residual energy theoretically calculated for the node.

3. The method of claim 1, wherein in the calculating of the relay probability, a value of the relay probability is increased in proportion to a difference between the measured amount of residual energy and the theoretically calculated amount of residual energy when the measured amount of residual energy is greater than the predetermined amount of residual energy.

4. The method of claim 1, wherein in the calculating of the relay probability, the value of the relay probability is reduced in proportion to the identified amount of information in the queue.

5. The method of claim 1, further comprising updating the relay probability by reflecting a variation in the measured amount of residual energy and a variation in the amount of information in the queue, wherein in the determining of the operation mode, the operation mode of the node is changed by reflecting the updated relay probability.

6. The method of claim 5, wherein in the updating of the relay probability, the relay probability is updated by reflecting the difference between the measured amount of residual energy and the theoretically calculated amount of residual energy when the difference between the measured amount of residual energy and the predetermined amount of residual energy is greater than a preset value.

7. The method of claim 5, wherein in the updating of the relay probability, the relay probability is updated by reflecting the amount of information in the queue when the difference between the measured amount of residual energy and the theoretically calculated amount of residual energy is equal to or less than the preset value.

8. An apparatus for determining an operation mode of a node in an ad hoc network based on information about a relay probability of the node, the apparatus comprising:
a monitoring unit monitoring an amount of residual energy of the node;
an information amount identifying unit identifying an amount of information in a queue of the node; and
a control unit comparing the monitored amount of residual energy of the node with an amount of residual energy theoretically calculated for the node, calculating a relay probability of the node by reflecting the identified amount of information in the queue and the result of comparing the monitored amount of residual energy of the node with the theoretically calculated amount of residual energy for the node, and determining the operation mode of the node based on the calculated relay probability.

9. The apparatus of claim 8, wherein the control unit determines transmission power of the node by reflecting the identified amount of information in the queue and the result of comparing the monitored amount of residual energy of the node with the theoretically calculated amount of residual energy for the node.

10. The apparatus of claim 8, wherein the control unit increases a value of the relay probability in proportion to a difference between the monitored amount of residual energy and the theoretically calculated amount of residual energy when the monitored amount of residual energy is greater than the theoretically calculated amount of residual energy and reduces the value of the relay probability in proportion to the identified amount of information in the queue.

* * * * *